June 5, 1945. R. D. ACTON 2,377,303
SAFETY SYSTEM FOR TRACTORS
Filed March 22, 1943 2 Sheets-Sheet 1
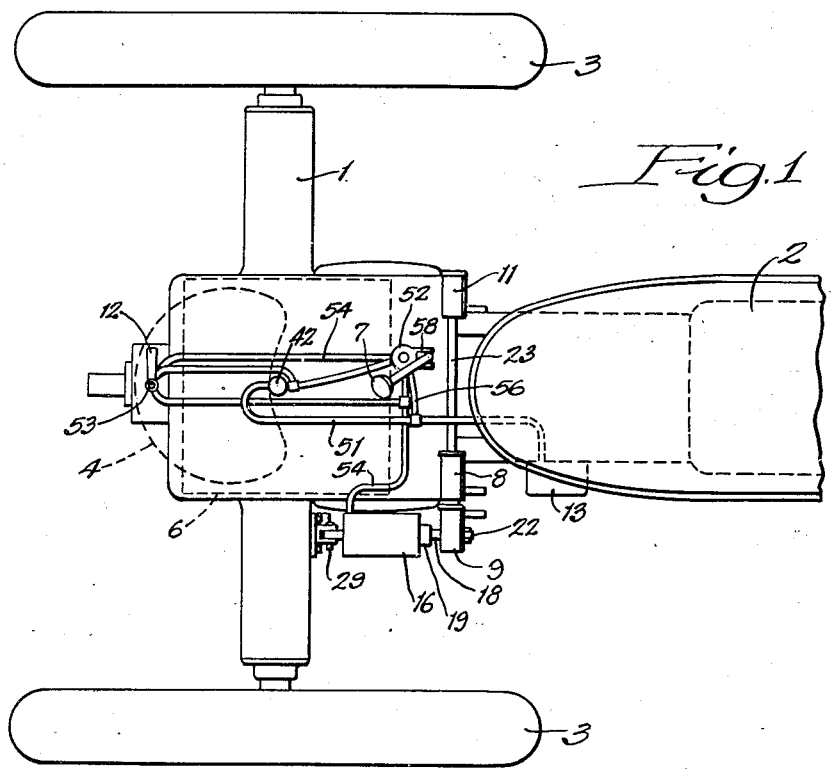
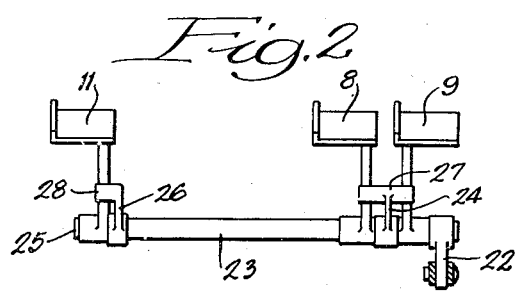
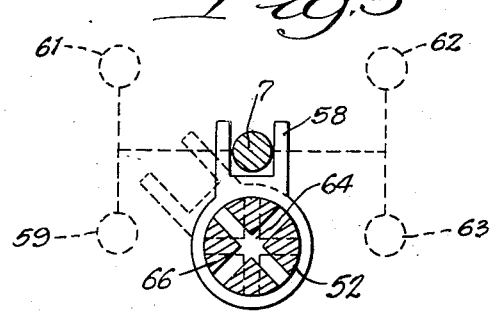
Inventor:
Russel D. Acton,
By Paul O. Pippel
Attorney.

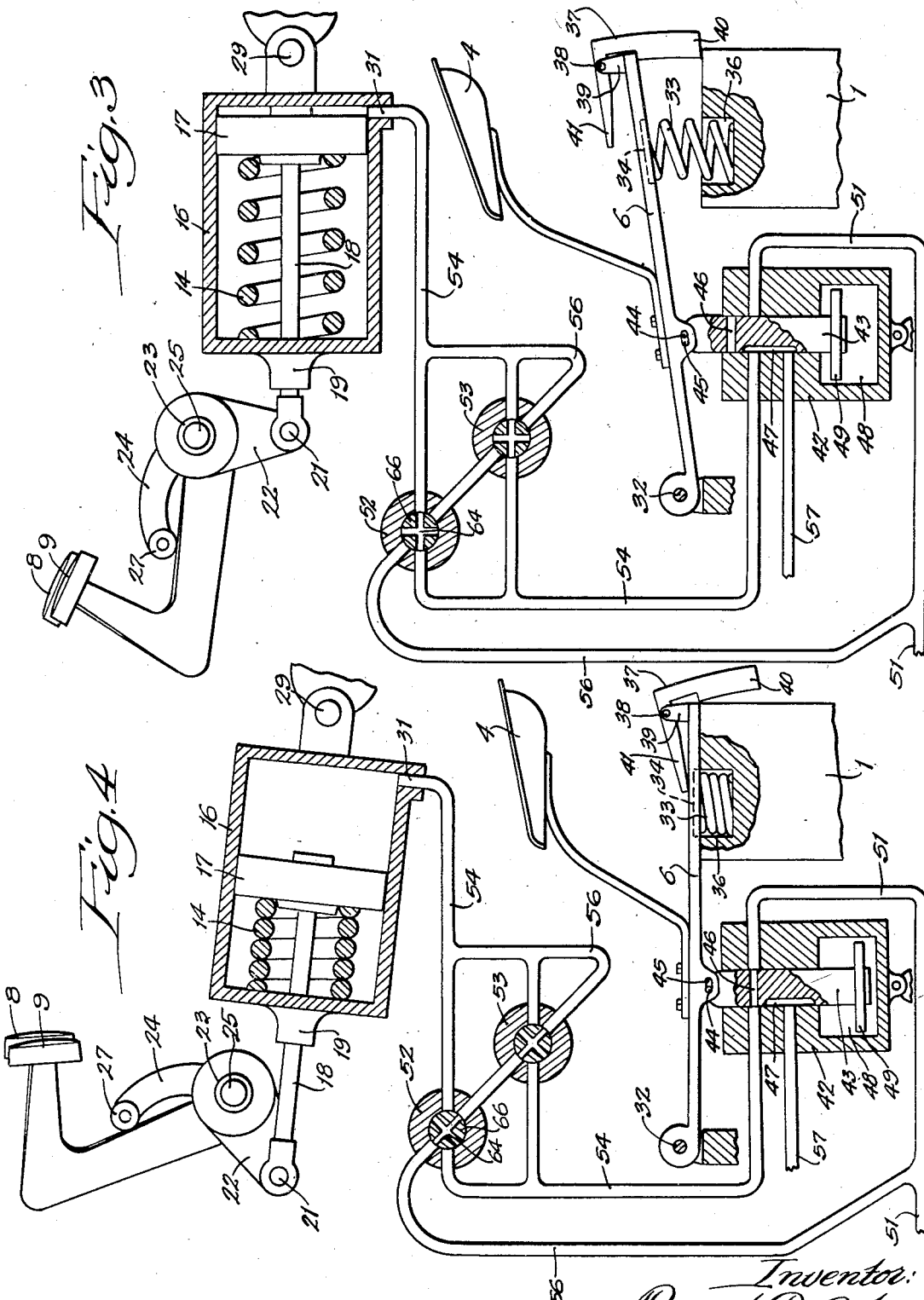

Patented June 5, 1945

2,377,303

UNITED STATES PATENT OFFICE 2,377,303

SAFETY SYSTEM FOR TRACTORS

Russel D. Acton, Chicago, Ill., assignor to International Harvester Company, a corporation of New Jersey Application March 22, 1943, Serial No. 480,030

12 Claims. (Cl. 180—82)

This invention relates to a new and improved safety system for tractors. It has for one of its principal objects the provision of means for preventing injury to persons and property by applying the brakes and releasing the clutch of a tractor when the operator ceases to have control.

An important object of this invention is to prevent cranking of the tractor engine when it is in gear.

Another important object of this invention is to promote a general safety of persons operating and in close proximity to the tractor, should the operator fall or be thrown from his operating position.

A further important object of this invention is to prevent operation of any implement taking its power from the tractor when the operator is not in full control.

A still further important object of the invention is to provide a hydraulic system for tractors or other automotive vehicles for positively locking the brakes when the operator is not in proper position on the tractor.

Other and further important objects of this invention will become apparent from the disclosures in the following specification and accompanying drawings, in which:

Figure 1 is a top plan view of a farm type of tractor shown partially in diagrammatic form;

Figure 2 shows a detail of the brake and clutch pedals associated with the tractor of Figure 1;

Figure 3 is a diagrammatic view showing the hydraulic system of this invention when the tractor is unattended;

Figure 4 is a view similar to that of Figure 3 with the tractor properly attended; and Figure 5 is a detail of the gear-shift lever and its associated plug valve forming a part of the hydraulic system of this invention.

As shown in the drawings, the reference numeral 1 indicates generally a chassis for a farm type of tractor to which the safety system of this invention is generally applied. The tractor, as shown in Figure 1, is provided with an engine 2, wheels 3, and a seat 4 for the reception of an operator. The seat 4 is mounted upon an operating platform 6, from which point the operator may control the tractor by means of a gear-shift lever 7, a clutch pedal 8, and brake pedals 9 and 11. A power take-off lever 12 is also easily operated from a position on the seat 4 or upon the operating platform 6.

At the present time many accidents are caused by runaway tractors when an operator might in some manner remove himself from the operating platform 6 or the seat 4 when the tractor is running and thereupon leave the tractor moving without being properly attended. The removal of the operator may be occasioned by a sudden turning of the tractor and cause him to be thrown from his position. This is especially true at the present time when so many inexperienced persons, such as young boys or women, are forced to operate farm tractors. Upon such an occurrence, it is foreseeable that the operator would be seriously injured by the tractor or the implement, being drawn by the tractor for the execution of some farm work, such as plowing, threshing, or the like, running over him. Oftentimes, tractors of this nature are not provided with starter motors, and the operator is required to crank the tractor. Here too, many accidents are caused by leaving the tractor engine in gear, with the result that the person cranking the same is run down when the engine suddenly starts and simultaneously is propelled forwardly.

The present invention has been developed to avoid such accidents, as heretofore enumerated, for the presently used tactors, and this end has been accomplished by reason of the particular hydraulic system now to be explained in greater detail.

A fluid reservoir 13 closely adjacent the engine 2 of the tractor, as shown in Figure 1 of the drawings, provides the fluid used in this hydraulic system. As best shown in Figure 3, a mechanical means is provided for depressing the clutch and brake levers 8, 9, and 11. A spring 14, enclosed within a cylinder 16, is free to act against a piston 17 and move the piston to one extreme end position in the cylinder 16. The piston 17 is provided with a piston rod 18 journaled within the bearing 19 and projecting therefrom to a point 21 where it is pivoted to the connecting arm 22, which is fixedly attached at its other end to a sleeve 23 telescopically journaled on the clutch and brake pedal shaft 25. Unitarily affixed to the sleeve 23 are the lever arms 24 and 26, which are provided with cross arms 27 and 28, respectively, for the purpose of depressing the clutch and brake pedals 8, 9, and 11. As shown in Figure 3, the clutch and brake levers 8, 9, and 11 are in a depressed position and, therefore, prohibit operation of the tractor.

The cylinder 16 is pivotally mounted to the chassis 1 of the tractor, as shown at 29. The piston 17, in addition to being operable mechanically by means of the spring 14, is also operable by means of a fluid under pressure entering the port 31 in the cylinder 16. As will be seen in Figures 3 and 4, the operating platform 6 and the seat 4 mounted unitarily thereon are hingedly movable relative to the chassis of the tractor. The forward end of the platform 6 is pivoted or hinged to the chassis 1 at 32 and is maintained in its uppermost position by a spring 33 acting against the rear end of the platform 6 within a recess 34. The spring 33 has its lower end positioned in a recess 36 of the chassis 1. An angle lever 37 is pivoted at 38 on an upward projection 39 of the platform 6. The depending arm 40 of the lever 37 is adapted to swing inwardly and thereby provide a positive means for maintaining the platform 6 in its uppermost position in addition to the upward force exerted by the spring 33. This angle lever 37 has an operating extension 41 which is capable of being depressed to remove the spacing arm 37 from its position intermediate the chassis 1 and the platform 6, as is shown in Figure 4.

A slide valve 42 is positioned beneath and centrally of the platform 6 and has its operating piston 43 pivotally attached to the under side of the platform 6 at 44, whereupon arcuate movement of the platform 6 about its hinged pivot point 32 causes reciprocation of the piston member 43. A slot 45 is provided in the member 43 at the hinged point 44 to prevent binding of the piston 43 within its housing 42. The piston 43 is provided with a through passage 46 and a surface channel 47 for the purpose of connecting and disconnecting conduits of this hydraulic system. A dash-pot 48 is provided in the lower end of the slide valve 42 and acts as a cushioning element upon sudden movement of the piston 43 by reason of the enlarged annular flange 49 integral with the lower end of the piston 43. A conduit 51 interconnects the fluid reservoir 13 and the slide valve 42, and, in the position as shown in Figure 3, the conduit comes directly in contact with a solid portion of the piston 43 and is thereby precluded from passing through the slide valve 42 until such time as the platform 6 is lowered and the piston 43 simultaneously lowered to the point where the through passage 46 directly alines itself with the conduit 51. Plug valves 52 and 53, operated respectively by the gear-shift lever 7 and the power take-off lever 12, are positioned intermediate the slide valve 42 and the pedal-controlling cylinder 16. The plug valves 52 and 53 are positioned in parallel with the conduit 54 adjoining the slide valve 42 and the cylinder 16. A further conduit 56 by-passes the slide valve 42 and interconnects the reservoir 13 and the cylinder 16 and has the plug valves 52 and 53 alined in series therein. The plug valves 52 and 53, as shown in Figure 3, indicate an "in gear" position of the tractor gear-shift lever 7 and the power take-off lever 12, and in such "in gear" position allow passage of fluid through the conduit 54 from the side valve 42 to the cylinder 16. However, with the platform 6 in an upward position, as illustrated, fluid from the reservoir may not pass through the slide valve 42 to gain entrance to the conduit 54. Further, fluid from the reservoir is permitted entrance to the conduit 56, but is prohibited from passing through the plug valves 52 and 53 by reason of their "in gear" position, and hence the piston 17 with the cylinder 16 remains in its present position holding the clutch and brake pedals depressed.

Now, upon shifting the levers 7 and 12 to a neutral position, as indicated by their associated plug valves 52 and 53 in Figure 4, fluid may pass from the conduit 56 coming from the reservoir 13 through the valves 52 and 53 and is permitted to reach the cylinder 16. Figure 4 shows the platform 6 depressed, but this is not necessary in order to have passage from the reservoir 13 through the conduit 56 to the cylinder 16, as heretofore described. In this position, the tractor may be cranked and the engine started without any one standing on the platform 6 or seated on the seat 4, providing the gear levers 7 and 12 are in a neutral position. Operation of the tractor engine causes the fluid in the reservoir 13 to be put under a pressure, and the fluid thereupon proceeds from the reservoir 13 to the conduit 56 through the valves 52 and 53 and thence to the cylinder 16 where it acts directly upon the piston 17, and as the pressure increases it eventually overcomes the tension in the spring 14 to completely compress the spring 14, as shown in Figure 4, to permit a raising of the clutch and brake pedals. The tractor may now be operated provided the attendant mounts the platform 6. If, however, the operator should attempt to throw the tractor in gear without mounting and depressing the platform 6, the tractor could not be made to move simply because the changing of the gear-shaft lever from a neutral position to "in gear" position, as shown at 52, in Figure 3, would immediately prohibit fluid under pressure from reaching the cylinder 16, and the fluid already in the cylinder 16 would immediately drain out through the conduit 54 through the surface channel 47 in the slide piston 43 and thereupon to the conduit 57 which is a return to the reservoir 13. This draining of fluid from the cylinder 16 permits extension of the spring 14 and immediate disengagement of the clutch by reason of the depression of the lever 8 and the concurrent application of the tractor brakes by reason of depression of the levers 9 and 11.

As soon as the operator mounts the platform 6 or the seat 4, as shown in Figure 3, and disengages the angle lever 37 from acting as a spacer between the tractor body and the platform 6 by depressing the lever extension 41, the platform 6 and its unitary seat 4 are caused to move downwardly from the weight of the operator overcoming the force exerted by the spring 33 in its upward extension. The platform 6 then assumes the position as shown in Figure 4 wherein the through passage 46 of the slide piston 43 alines the conduits 51 and 54 and permits passage of fluid under pressure from the reservoir 13 through the slide valve 42. With the valves 52 and 53 in a position as shown in Figure 4 corresponding to neutral positions of their associated levers 7 and 12, the fluid in the conduit 54 is not permitted passage from the slide valve side to the cylinder (16) side. However, as previously stated, when the gear-shift lever 7 and power take-off lever 12 are in neutral, fluid passes directly from the reservoir to the cylinder 16, and it is not necessary to have fluid from the reservoir passing through slide valve 42 to the cylinder 16 in order to overcome the tension in the spring 14. Assuming now that the engine of the tractor is running, the fluid in the reservoir is put under pressure and forced through the conduit 56 through the valves 52 and 53 to the cylinder 16, permitting the clutch and brake pedals 8, 9, and 11 to be raised, and, with the operator in position on the seat 4 or standing upon the platform 6, he may shift the lever 7 to an "in gear" position and although fluid under pressure is stopped from passing through the conduit 56, it is now permitted to pass through the slide valve 42 through the valve 52 to the chamber 16 where it again overcomes the tension in the spring 14. Operation of the power take-off lever 12 to an "in gear" position likewise stops passage through the conduit 56 but permits passage through the conduit 54, and it will be readily seen that the tractor may be propelled forwardly and simultaneously operate implements through the power take-off. It will also be seen that it is not necessary for the tractor to be "in gear" and running forwardly in order that the power take-off may be employed, as, even though fluid is stopped from passing the valve 52, it is permitted passage past the valve 53 by reason of its parallel arrangement within the conduit 54.

As best shown in Figure 5, the tractor gear-shift lever 7 operatively engages its associated plug valve or cock 52 by a forked or bifurcated head 58, which is an integral part of the valve 52. As shown, the tractor engine is supplied with four forward speeds 59, 61, 62, and 63, and, upon movement of the lever 7 to any one of these positions, the cross-passages 64 within the plug 66 of the plug valve 52 will shift from the diagonal neutral position to the horizontal and vertical position, as shown by the dotted lines in this Figure 5 or in full lines in Figure 3. A similar arrangement is utilized by the power take-off lever 12 in its operation of the plug valve or cock 53.

It will be seen that herein is provided a safety device for tractors or any automotive vehicle which may be operated only when the operator is mounted in his proper position on the tractor or automotive vehicle, with one exception, when the gear-shift lever and the power take-off lever are in neutral position. The device is conducive to absolute safety of operation and is completely automatic so that it does not require any manual adjustment which would tend to cause the device not to be completely foolproof.

I am aware that numerous details of construction may be varied throughout a wide range without departing from the principles disclosed herein, and I, therefore, do not propose limiting the patent granted hereon otherwise than as necessitated by the prior art.

What is claimed is:

1. A safety system for tractors having brakes, a clutch and a gear-shifting mechanism, comprising an operating station pivotally mounted with respect to said vehicle, spring means for maintaining said station in its uppermost position from said vehicle, a valve operated by the movement of said platform to and from said vehicle, a source of fluid under pressure, spring means for constantly urging the application of the brakes and the releasing of the clutch of said vehicle, a valve operating in conjunction with said gear-shifting mechanism, and conduits interconnecting the source of fluid under pressure with the station-operated valve, the gear shifting mechanism operated valve, and the means for applying the brakes and releasing the clutch, whereby when the gear shifting mechanism is in some predetermined position and the operator's station is depressed against its spring means, the fluid under pressure is permitted to counteract the action of the spring means constantly urging the application of the brakes and the release of the clutch.

2. A safety system for tractors having brakes, a clutch and a gear-shifting lever, comprising an operating platform hingedly mounted with respect to said vehicle, means for resiliently maintaining said platform in its uppermost position from said vehicle, a slide valve operated by reciprocable movement of said platform to and from said vehicle, a source of fluid under pressure, resilient means for continuously urging the application of the brakes and the releasing of the clutch of said vehicle, a plug valve operated in conjunction with said gear-shifting lever, conduits interconnecting the source of fluid under pressure with the slide valve and the plug valve, other conduits connecting the slide valve with the plug valve and the plug valve with the resilient means for urging the application of the brakes and the releasing of the clutch, whereby the fluid under pressure acts to release the brakes and apply the clutch when the slide valve and plug valve are in predetermined positions depending on the operating platform and the gear shifting lever.

3. A safety system for tractors having an engine, brake pedals, a clutch pedal, a gear-shift lever, and a power take-off lever, comprising a hingedly mounted operating platform, means for normally raising the free end of the hinged platform, a slide valve actuated by movement of said platform, a fluid reservoir, means for causing the fluid to be put under pressure upon running of the tractor engine, spring means for simultaneously depressing the brake and clutch pedals, means for counteracting the action of the spring means, said means comprising a piston within a cylinder, means for directing fluid under pressure to said cylinder to counteract the action of the spring means to cause releasing of the brakes and clutch, and a pair of cocks operable by said gear-shift lever and said power take-off lever, the said cocks positioned in parallel in a conduit between the said slide valve and the said cylinder, the said cocks in series in a conduit between said reservoir and said cylinder.

4. A safety system for tractors having an engine, brake pedals, a clutch pedal, a gear-shift lever and a power take-off lever comprising a hingedly mounted operating platform, a seat on said platform, spring means for normally raising the free end of the hinged platform, means for automatically locking the platform in a raised position, a slide valve reciprocated by arcuate movement of said platform, a fluid reservoir, means for putting the fluid under pressure upon running of the tractor engine, lever means for simultaneously depressing the brake and clutch pedals, said lever means actuated by a reciprocable piston within a cylinder, spring means within said cylinder on one side of said piston to normally cause depression of the brake and clutch pedals, a pair of valves operable by said gear-shift lever and said power take-off lever, whereby under predetermined positions of said levers and platform fluid under pressure is permitted to reach the said cylinder on the other side of said piston and thus counteract the action of the springs and release the brake and clutch pedals.

5. A safety system for tractors having an engine, clutch and brake pedals, gear-shift and power take-off levers, comprising a hingedly mounted operating platform, spring means for normally raising the free end of the hinged platform, catch means for automatically locking the platform in a raised position, a slide valve reciprocated by arcuate movement of said platform, a fluid reservoir, means for causing the fluid to be put under pressure upon running of the tractor, lever means for simultaneously depressing the brake and clutch pedals, said lever means actuated by a reciprocable piston within a cylinder, spring means within said cylinder on one side of said piston to normally cause depression of the brake and clutch pedals, a pair of valves operable by said gear-shift lever and said power take-off lever, the said valves positioned in parallel in a conduit between the said slide valve and the said cylinder, the said valves arranged in series in a conduit between said reservoir and said cylinder, and further conduits between said reservoir and said slide valve including supply and return lines, whereby in predetermined positions of said levers and platform fluid under pressure is permitted to reach the said cylinder on the other side of said piston and thus counteract the action of the spring and release the brake and clutch pedals, said predetermined positions being when the platform is depressed and once when the platform is raised at a time when the gear-shift lever and power take-off lever are in neutral position.

6. A safety system for tractors having a clutch, a brake, and a source of fluid under pressure when the engine of the tractor is operating, comprising a platform hinged to the tractor and carrying an operator's seat whereby the operator may be either seated or standing with his weight carried by said platform, a resilient means operable to depress both the brake and the clutch pedal whereby said means is effective to apply the brake and to disengage the clutch, a gear-shift lever for selecting different speed ratios of the tractor drive mechanism and a power take-off clutch mechanism for controlling the operation of a power take-off shaft; a master valve device connected to the platform for operation thereby, resilient means for urging the platform in an upward direction when the operator leaves the platform, latch means automatically operable to block the platform against downward movement after it has been moved upwardly, said latch means being releasable by an operator, a fluid pressure device connected to the brake and clutch-operating means for overcoming the action of the spring and holding said means in inoperative position whereby the brake and clutch levers are free for operation, a fluid pressure conduit connecting the source of fluid pressure with the valve device, means for returning fluid at zero pressure from the valve device to a fluid reservoir, a conduit for supplying fluid under pressure from the valve device to a pair of valve devices each associated with one of the control means for the gear shift and the power take-off, a conduit means connecting said valve devices with the fluid pressure device, said valve devices being constructed to provide communication between the master valve device as operated by the platform and the fluid pressure cylinder, said master valve device being operable to supply fluid under pressure when the platform is in lowered position and to relieve pressure from the fluid cylinder device when the platform is in raised position; a fluid conduit connected with the fluid under pressure and the fluid pressure device, said conduit passing through the valve devices and said valve devices being constructed to supply fluid under pressure to said fluid pressure device when both the gear shift and the power-take-off are in neutral position.

7. A safety system for tractors having a power plant for supplying power for operation of the vehicle, comprising means for supplying fluid under pressure when the power plant is operated, an operator's station movably mounted on the tractor between a lowered and a raised position, resilient means for urging the station to the raised position when the operator is off the station, a gear shift lever, a control valve actuated by movement of the operator's station, said control valve communicating with the source of fluid under pressure, a means for stopping power movement of the tractor, a fluid-pressure-operated means for rendering said means inoperative and permitting power movement of the tractor whereby pressure in the system is necessary for tractor operation, fluid conduit means connecting the control valve with said fluid-pressure-operated means, valve means interposed in said conduit and communicating with said fluid-pressure supply means, said valve means being connected to the gear shift lever and operable thereby to provide a communication through said conduit when the lever is in gear position and operable to provide a communication between the fluid-pressure-operated means and the fluid-pressure supply means when the gear shift lever is in neutral position, and a pressure release means associated with said control valve, said control valve being operable when the operator's station is in lowered position to supply fluid under pressure to the valve means and being operable when the said station is in raised position to connect said valve means with the pressure release conduit.

8. A safety system for a tractor having a power plant and a brake mechanism for the tractor, comprising means for supplying fluid under pressure when the power plant is operated, an operator's station movably mounted on the tractor between a lowered and a raised position, resilient means for urging the station to the raised position when the operator is off the station, a gear shift lever, a control valve actuated by movement of the operator's station, said control valve communicating with the source of fluid under pressure, means for actuating the brake mechanism of the tractor, a fluid-pressure-operated means for rendering said means inoperative and releasing the brake mechanism of the tractor whereby pressure in the system is necessary for tractor operation, fluid conduit means connecting the control valve with said fluid-pressure-operated means, valve means interposed in said conduit and communicating with said fluid-pressure supply means, said valve means being connected to the gear shift lever and operable thereby to provide a communication through said conduit when the lever is in gear position and operable to provide a communication between the fluid-pressure-operated means and the fluid-pressure supply means when the gear shift lever is in neutral position, and a pressure release means associated with said control valve, said control valve being operable when the operator's station is in lowered position to supply fluid under pressure to the valve means and being operable when the said station is in raised position to connect said valve means with the pressure release conduit.

9. A safety system for a tractor having a power plant and a clutch mechanism for the tractor, comprising means for supplying fluid under pressure when the power plant is operated, an operator's station movably mounted on the tractor between a lowered and a raised position, resilient means for urging the station to the raised position when the operator is off the station, a gear shift lever, a control valve actuated by movement of the operator's station, said control valve communicating with the source of fluid under pressure, means for releasing the clutch mechanism of the tractor, a fluid-pressure-operated means for rendering said means inoperative and permitting engagement of the clutch mechanism of the tractor whereby pressure in the system is necessary for tractor operation, fluid conduit means connecting the control valve with said fluid-pressure-operated means, valve means interposed in said conduit and communicating with said fluid-pressure supply means, said valve means being connected to the gear shift lever and operable thereby to provide a communication through said conduit when the lever is in gear position and operable to provide a communication between the fluid-pressure-operated means and the fluid-pressure supply means when the gear shift lever is in neutral position, and a pressure release means associated with said control valve, said control valve being operable when the operator's station is in lowered position to supply fluid under pressure to the valve means and being operable when the said station is in raised position to connect said valve means with the pressure release conduit.

10. A safety system for tractors having an engine, a clutch, a gear shift lever, and a movably mounted operator's station, comprising spring means for exerting upward pressure against said station, said spring means being overcome to lower the station when the operator is in position thereon, spring means acting to release the clutch, a fluid-pressure actuated means operable to overcome said spring means and permit actuation of the clutch, valve means, fluid-conducting means connecting said valve means with said pressure-actuated means, a control valve operable by movement of the operator's station, means for supplying fluid under pressure to said valve means and said control valve upon operation of the engine, a conduit connecting said control valve with said valve means, and a fluid-pressure release means associated with said control valve, said valve means being operable by the shift lever to connect the pressure supply means with the pressure-actuated means when the lever is in neutral position and to connect said pressure-actuated means with the control valve when the lever is in gear-engaging position, said control valve in the lowered position of the operator's station providing communication between the fluid-pressure supply means and the valve means and in the raised position providing communication between valve means and the pressure release conduit.

11. A safety system for tractors having an engine, a brake, a gear shift lever, and a movably mounted operator's station, comprising spring means for exerting upward pressure against said station, said spring means being overcome to lower the station when the operator is in position thereon, spring means actuating the brake, a fluid-pressure-actuated means operable to overcome said spring means and release actuation of the brake, valve means, fluid-conducting means connecting said valve means with said pressure-actuated means, a control valve operable by movement of the operator's station, means for supplying fluid under pressure to said valve means and said control valve upon operation of the engine, a conduit connecting said control valve with said valve means, and a fluid-pressure release means associated with said control valve, said valve means being operable by the shift lever to connect the pressure supply means with the pressure-actuated means when the lever is in neutral position and to connect said pressure-actuated means with the control valve when the lever is in gear-engaging position, said control valve in the lowered position of the operator's station providing communication between the fluid-pressure supply means and the valve means and in the raised position providing communication between said valve means and the pressure release conduit.

12. A safety system for tractors having a power plant for supplying power for operation of the vehicle and a power take-off shaft, comprising means for supplying fluid under pressure when the power plant is operated, an operator's station movably mounted on the tractor between a lowered and a raised position, resilient means for urging the station to the raised position when the operator is off the station, a shift lever for engaging the power take-off shaft, a control valve actuated by movement of the operator's station, said control valve communicating with the source of fluid under pressure, means for stopping power movement of the tractor, a fluid-pressure-operated means for rendering said means inoperative and permitting power movement of the tractor whereby pressure in the system is necessary for tractor operation, fluid conduit means connecting the control valve with said fluid-pressure-operated means, valve means interposed in said conduit and communicating with said fluid-pressure supply means, said valve means being connected to the shift lever and operable thereby to provide a communication through said conduit when the lever is in power transmitting position and operable to provide a communication between the fluid-pressure-operated means and the fluid-pressure supply means when the shift lever is in neutral position, and a pressure release means associated with said control valve, said control valve being operable when the operator's station is in lowered position to supply fluid under pressure to the valve means and being operable when the said station is in raised position to connect said valve means with the pressure release conduit.

RUSSEL D. ACTON.